(12) United States Patent
Debnath et al.

(10) Patent No.: US 12,474,911 B2
(45) Date of Patent: Nov. 18, 2025

(54) SYSTEM AND METHOD FOR STAGGERING FEATURE ENABLEMENT BASED ON CALL CENTER TENANT ATTRIBUTES TO CONTROL RELEASE IMPACT

(71) Applicant: inContact INC., Sandy, UT (US)

(72) Inventors: Ashadeepa Debnath, Maharashtra (IN); Harshad Ambekar, Maharashtra (IN); Yuvraj Sawant, Maharashtra (IN)

(73) Assignee: inContact INC.

( * ) Notice: Subject to any disclaimer, the term of this patent is extended or adjusted under 35 U.S.C. 154(b) by 660 days.

(21) Appl. No.: 17/536,027

(22) Filed: Nov. 28, 2021

(65) Prior Publication Data

US 2023/0168879 A1 Jun. 1, 2023

(51) Int. Cl.
*G06F 8/65* (2018.01)
*G06F 9/451* (2018.01)
*H04L 41/22* (2022.01)
*H04L 67/00* (2022.01)

(52) U.S. Cl.
CPC ............... *G06F 8/65* (2013.01); *G06F 9/453* (2018.02); *H04L 41/22* (2013.01); *H04L 67/34* (2013.01)

(58) Field of Classification Search
CPC ... G06F 8/65; G06F 9/453; G06F 8/60; H04L 41/22; H04L 67/34
See application file for complete search history.

(56) References Cited

U.S. PATENT DOCUMENTS

| 10,915,379 | B1 * | 2/2021 | Verma ...................... G06F 8/65 |
| 11,379,217 | B1 * | 7/2022 | Eberlein ............. G06F 9/44505 |
| 2022/0103621 | A1 * | 3/2022 | Lucas ..................... H04L 67/34 |

OTHER PUBLICATIONS

Mahdavi-Hezaveh, Rezvan, Jacob Dremann, and Laurie Williams. "Software development with feature toggles: practices used by practitioners." Empirical Software Engineering 26.1 (2021): 1. (Year: 2021).*

(Continued)

*Primary Examiner* — S. Sough
*Assistant Examiner* — Cheneca Smith
(74) *Attorney, Agent, or Firm* — SOROKER AGMON NORDMAN RIBA

(57) ABSTRACT

A computerized-method to operate a feature-toggles-enablement associated with a product feature present under a release-plan, in a staggered manner, based on tenants' prioritization for tenants of a cloud-based Software as a contact-center Service (SaaS) platform. The computerized-method may be operating a Staggered-Feature-Enablement (SFE) module. The SFE module may include: selecting a plurality of tenants, for a feature-toggles-enablement associated with a product feature present under a release-plan; operating a tenant-tier-resolver model to determine a tier-level-value and feature toggle enablement-state, for each tenant of the selected plurality of tenants; operating a feature toggle enablement module to enable feature toggles associated with a product feature present under the release-plan for tenants based on the determined tenant's tier-level-value; and sending a notification with details of each feature-toggles-enablement to a corresponding tenant administrator, to be displayed via a display unit.

16 Claims, 7 Drawing Sheets

(56) References Cited

OTHER PUBLICATIONS

Pinnecke, Marcus. "Product-lining the elinvar wealthtech microservice platform." Proceedings of the 25th ACM International Systems and Software Product Line Conference—vol. B. 2021. Retrieved from Internet <https://dl.acm.org/doi/pdf/10.1145/3461002.3473947> (Year: 2021).*

* cited by examiner

| Category | Day-1 | Day-2 | Day-3 |
|---|---|---|---|
| Total Tenants | 6000 | 9000 | 5000 |
| Enabled Tenant | 3500 | 4000 | 3000 |
| Pending Tenant | 2500 | 5000 | 2000 |
| Error Rate | 2% | 1% | 4% |

| Tenant Id | Structure |
|---|---|
| f966349c-e054-4a52-bf55-8691f3e367d1 | {"tenantTierValue":1, "featureToggles":{"ft1":false,"ft2":false,"ft3":false }, "redirect": {"/url1":false,"/url2":false,"/url3":false }} |
| f277cd47-042d-4c76-80dc-a40f7c8a9287 | {"tenantTierValue":2, "featureToggles":{"ft1":false,"ft2":false,"ft3":false }, "redirect": {"/url1":false,"/url2":false,"/url3":false }} |
| 34807623-b699-4aad-8465-2feb21a3a545 | {"tenantTierValue":3, "featureToggles":{"ft1":true,"ft2":false,"ft3":false }, "redirect": {"/url1":true,"/url2":false,"/url3":false }} |
| beed640d-f2d0-4fc6-9b74-3b8bd49f3bf1 | {"tenantTierValue":4, "featureToggles":{"ft1":true,"ft2":true,"ft3":false }, "redirect": {"/url1":true,"/url2":true,"/url3":true }} |
| b7255cba-46b3-4b8d-ad9f-547d507489de | {"tenantTierValue":5, "featureToggles":{"ft1":true,"ft2":true,"ft3":false }, "redirect": {"/url1":true,"/url2":true,"/url3":true }} |

Figure 6

SYSTEM AND METHOD FOR STAGGERING FEATURE ENABLEMENT BASED ON CALL CENTER TENANT ATTRIBUTES TO CONTROL RELEASE IMPACT

TECHNICAL FIELD

The present disclosure relates to the field of new feature release of applications via feature toggles enablement in a cloud-based computing environment. More specifically, the present disclosure relates to the field of new product feature release of applications via feature toggles enablement based on call center tenant attributes to control the product feature release impact.

BACKGROUND

A cloud-based Software as a Service (SaaS) solution that is serving 24/7 contact centers, may be implemented in mission critical organizations, such as 911 and hospitals where business continuity is a top priority. This type of businesses may not afford disruptions in their cloud-based systems, e.g., during new product feature release.

From time to time, a cloud-based SaaS solution provider may have to enable new one or more features of a User Interface (UI) and Application Programming Interface (API) for all or some of its tenants. The enablement of the new features may be operated via a release plan having a feature toggle service, where each feature toggle service has a related Uniform Resource Identifier (URI) that includes a Uniform Resource Locator (URL), i.e., web address.

Current solution for releasing a new product feature to a plurality of tenants by a SaaS provider has no control. In case of a disruption in one of the feature toggles, i.e., in the execution of the related code, which is in the associated URI, the operation of a rollback to previous version of the code may be complicated and may result with tenant site outage.

Moreover, a manual rollback may take approximately 38 minutes to 56 minutes as many tenants' stake holders have to agree before operating the rollback. For each outage in a tenant site the SaaS provider gives credit to the tenant and the amount may be high.

One of the reasons for the complication is that it is very difficult to determine the exact point of failure because the bot which enables the feature toggles is enabling it for all customers, i.e., tenants at once. A backward compatibility may be guaranteed, by defined architectural guidelines; however, a forward compatibility may not be guaranteed, hence, there is a possibility that all tenants will face issues while operating the cloud-based SaaS solution after the rollback.

Therefore, for SaaS providers there is a need for a technical solution for customer retention by avoiding outages and to guarantee a forward compatibility in case a rollback is required. Furthermore, there is a need for a method and system to operate a feature toggles enablement associated with a product feature present under a release plan, in a staggered manner based on tenants' prioritization for tenants of a cloud-based Software as a contact-center Service (SaaS) platform.

SUMMARY

There is thus provided, in accordance with some embodiments of the present disclosure, a computerized-method to operate a feature toggles enablement associated with a product feature that is present under a release plan, in a staggered manner based on tenants' prioritization for tenants of a cloud-based Software as a contact-center Service (SaaS) platform.

Furthermore, in accordance with some embodiments of the present disclosure, in a cloud-computing environment that is operating a contact-center SaaS platform for one or more tenants, the cloud-computing environment includes one or more processors, a data store of data related to one or more tenants. The one or more processors may operate a Staggered-Feature-Enablement (SFE) module.

Furthermore, in accordance with some embodiments of the present disclosure, the SFE module may include: (i) selecting a plurality of tenants from the data store of data related to one or more tenants, for a feature toggles enablement associated with a product feature present under a release plan; (ii) operating a tenant-tier-resolver model to determine a tier-level-value and feature toggle enablement-state, to be stored in the data store of data related to one or more tenants, for each tenant of the selected plurality of tenants; (iii) operating a feature toggle enablement module to enable feature toggles associated with a product feature present under the release plan for tenants based on the determined tenant's tier level; and (iv) sending a notification with details of each feature toggles enablement to a corresponding tenant administrator, to be displayed via a display unit.

Furthermore, in accordance with some embodiments of the present disclosure, the product feature present under the release plan may be of a User Interface (UI) or an Application Programming Interface (API).

Furthermore, in accordance with some embodiments of the present disclosure, the SFE module may further include sharing a link to a help-document via a knowledge management platform that is explaining the product feature present under the release plan after all feature toggles under the plan release have been enabled.

Furthermore, in accordance with some embodiments of the present disclosure, the link to the help-document may be shared with users to whom the product feature present under the release plan applies.

Furthermore, in accordance with some embodiments of the present disclosure, the link to the help-document may be displayed when a user visits a UI that is associated with the feature toggles that have been enabled.

Furthermore, in accordance with some embodiments of the present disclosure, the tenant-tier-resolver model may determine the tier-level-value for each tenant based on formula I:

$$\text{Tenant Tier Level Value} = \text{if}(TCC! = \text{NULL}) \text{ then } TCC \text{ else ITTV} \quad (I)$$

whereby:

Tenant Tier level value as per Custom Config (TCC) is a preconfigured tenant tier level value, Interim Tenant Tier Value (ITTV) is calculated by formula II:

$$ITTV = \text{MIN}(TNS, TIS) \quad (II)$$

whereby:

Tenant tier value as per Number of Seats (TNS) is an associated number of agents and users that are using the product feature under the release plan, and Tenant tier value as per Impact Rank (TIS) is calculated based on formula III:

$$TIS = 6 - \text{CEILING}(((\text{Impact Rank}/a \text{ preconfigured number}) * 100) * 5)/100) \quad (III).$$

Furthermore, in accordance with some embodiments of the present disclosure, the Impact Rank of a tenant may be retrieved from tenant metadata that may be stored in the data store of data related to one or more tenants. A high account impact score may indicate that the tenant is a highly valued tenant and any disruptions in uptime can cause major loss to the tenant. A tenant with a higher impact rank may be related to tier-level '1' or '2', based on the result of formula I.

Furthermore, in accordance with some embodiments of the present disclosure, the feature toggle enablement module may enable feature toggles, associated with the product feature present under a release plan, tenant by tenant for a current tier-level-value and in the order of from a highest tier-level-value and down. The highest tier-level-value may be a tier-level of least significant tenants for the provider of the contact-center SaaS platform. For example, tenants of tier-level-value "5 may be enabled first which have least significant tenants under it and then tier-level-value '4' and so on when there are tier-level-values of '1' through '5'.

Thus, by releasing a new product feature a group of tenants related to one determined tier-level-value at a time and checking an error rate before proceeding the new feature release to the next group of tenants determined as related to the next tier-level, reducing time and complexity during rollback.

Furthermore, in accordance with some embodiments of the present disclosure, the feature toggle enablement module may further check an error rate during the enablement of the feature toggles, associated with the product feature present under the release plan and when the checked error rate may be higher than an error rate that has been observed before the operating of the feature toggle enablement module, the feature toggle enablement module may be paused.

Furthermore, in accordance with some embodiments of the present disclosure, the feature toggle enablement module may use a log-filtering technique to check the error rate. For example, when enabling the feature toggles, and the new code of API and UI may be used, then if there are failures errors recorded under the logs, the system may identify these failures for a service and feature related to the enabled feature toggles.

Furthermore, in accordance with some embodiments of the present disclosure, when the feature toggle enablement module may be paused an alarm may be raised via a reporting mechanism and after the alarm may have been raised, details of a last enabled feature toggle may be sent via a messaging service to be displayed on a display unit of a computerized device.

Furthermore, in accordance with some embodiments of the present disclosure, when the feature toggle enablement module may have finished enabling all feature toggles which are associated with the product feature present under the release plan for all tenants in the current tier-level-value and the checked error rate may be lower than an error rate observed before operating the feature toggle enablement module, then the computerized-method may further include operating the feature toggle enablement module to further enable feature toggles associated with the product feature present under the release plan, tenant by tenant of the next tier-level-value.

Furthermore, in accordance with some embodiments of the present disclosure, when the feature toggle enablement module may finish the enablement of feature toggles which are associated with the product feature present under the release plan for all tenants in all tier-level-values, the enablement of feature toggles associated with the product feature present under of the release plan may end.

Furthermore, in accordance with some embodiments of the present disclosure, when a feature toggle enablement-state may be 'true' for a tenant, the SFE module may further include operating a config and feature toggle API module to add a name of the tenant under an inclusion list. When the feature toggle enablement-state is 'true' it means that API or UI requests from computers of users of the tenant may be forwarded to a new version of the feature. In other words, users of the tenant may use the new product feature of the SaaS platform.

Furthermore, in accordance with some embodiments of the present disclosure, the release plan may include one or more feature toggles and an enablement time and each feature toggle of the one or more feature toggles may include a feature toggle name and an associated Uniform Resource Identifier (URI).

Furthermore, in accordance with some embodiments of the present disclosure, the tenant-tier-resolver model and the feature toggle enablement module may operate when the enablement time of the release plan has elapsed.

Furthermore, in accordance with some embodiments of the present disclosure, when the feature toggle enablement module may enable a feature toggle it may also enable a Uniform Resource Identifier (URI) that may be associated with the enabled feature toggle.

There is further provided, in accordance with some embodiments of the present disclosure, a computerized-system in a cloud-computing environment to operate a feature toggles enablement associated with a product feature present under a release plan in a staggered manner based on tenants' prioritization for tenants of a cloud-based Software as a contact-center Service (SaaS) platform.

Furthermore, in accordance with some embodiments of the present disclosure, the computerized-system may include: one or more processors, and a data store of data related to one or more tenants. The one or more processors may be configured to operate Staggered-Feature-Enablement (SFE) module.

Furthermore, in accordance with some embodiments of the present disclosure, the SFE module may be configured to: (i) select a plurality of tenants from the data store of data related to one or more tenants, for a feature toggles enablement of associated with a product feature present under a release plan; (ii) operate a tenant-tier-resolver model to determine a tier-level-value and feature toggle enablement-state to be stored in the data store of data related to one or more tenants for each tenant of the selected plurality of tenants; (iii) operate a feature toggle enablement module to enable feature toggles associated with a product feature present under the release plan release plan for tenants based on the determined tenant's tier level; and (iv) send a notification with details of each feature toggles enablement to a corresponding tenant administrator, to be displayed via a display unit.

BRIEF DESCRIPTION OF THE DRAWINGS

FIG. 6 illustrates an example of a table to track progress of a release plan, in accordance with some embodiments of the present disclosure.

DETAILED DESCRIPTION

Figure 1:
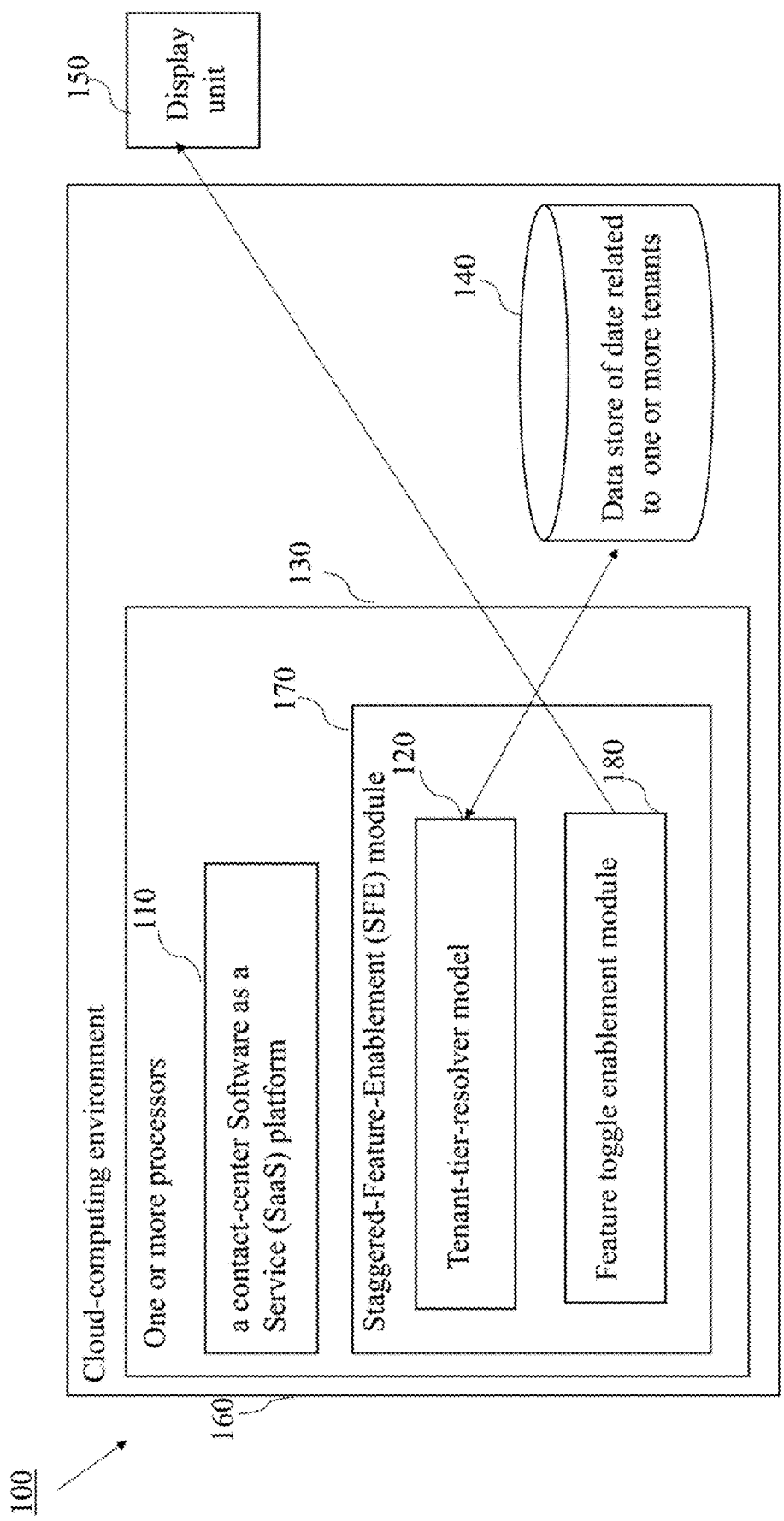
FIG. 1 schematically illustrates a high-level diagram of a system for feature toggles enablement that is associated with a product feature present under a release plan, in a staggered manner based on tenants' prioritization for tenants of a cloud-based Software as a contact-center Service (SaaS) platform, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "stablishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "customer", as used herein, refers to a tenant that is provided with a contact center cloud-based Software as a Service (SaaS) platform by a cloud-based contact-center SaaS platform provider.

The term "feature toggles", as used herein, refers to a mechanism that remotely turns code "on" or "of" without the need for a deployment process of the code.

The terms "impact score" or "impact rank" as used herein, refers to an account impact score, which may be precalculated based on one or more parameters and stored in tenant metadata in a data store of data related to one or more tenants. A high account impact score may indicate that the tenant is a highly valued tenant and any disruptions in uptime can cause major loss to the tenant. The impact score of a tenant may be retrieved from tenant metadata that may be stored in the data store of data related to one or more tenants.

The term "Uniform Resource Locator (URL)", as used here in, refers to a Uniform Resource Identifier (URI), since the release plan is operating across regions around the world it may be agnostic to region settings and therefore may use Uris, as each region has a separate host and the URL for every region may be different.

A contact-center cloud-based Software as a Service (SaaS) platform, is a bundle of contact center application services which are provided to tenants over the internet. From time to time, a provider of a contact-center cloud-based SaaS platform releases a new product feature via a feature toggles mechanism.

Current technical solution for a new product feature release for a contact-center SaaS platform provider is to release the new product feature to all tenants at once, thus putting business continuity of the tenants at risk. Mission critical organizations like 911 and hospitals and organizations which operate 24/7 cannot afford a disruption to their business continuity and regressions under the software may put people's life in danger. Also, such customers have no option to opt out and delay enablement of new features till they stabilize.

In case of disruption, when the process of feature enablement fails, taking a rollback decision may be too complicated, as it is hard to determine the exact point of failure when the bot enables the feature toggles for all customers at once. In case of disruption. Technical Account Manager (TAM) have to interact with multiple customers at the same time, which may be overwhelming. Also, during outages, Site Reliability Engineers (SRE) have to go through a dashboard of multiple platform services to find out the exact point of failure. They perform this in a reactive manner when something has failed.

Accordingly, there is a need for a technical solution that will provide a new product feature release mechanism that will minimize the impact of product new feature release as described above and guarantee forward compatibility while rolling back when necessary.

Furthermore, there is a need for a computerized-system and a computerized method to operate a feature toggles enablement associated with a product feature present under a release plan, in a staggered manner based on tenants' prioritization for tenants of a cloud-based contact-center Software as a Service (SaaS) platform. The staggered feature toggles enablement should be based on multiple factors which are related to contact-center parameters, tenants' parameters, Technical Account Managers (TAM) rating and customer and system, preferences to gradually enable features for tenants, based on tenant tier level to control the release of product features.

FIG. 1 schematically illustrates a high-level diagram of a system 100 to operate a feature toggles enablement associated with a product feature that is present under a release plan, in a staggered manner based on tenants' prioritization, for tenants of a cloud-based contact-center SaaS platform, in accordance with some embodiments of the present disclosure.

According to some embodiments of the present discourse, in a cloud-computing environment, such as cloud-computing environment 160, that is operating a contact-center SaaS-platform, such as SaaS platform 110 for one or more tenants, the cloud-computing environment 160 may include one or more processors 130, and a data store, such as data store of data related to one or more tenants 140.

According to some embodiments of the present discourse, the one or more processors 130 may operate a module, such as Staggered-Feature-Enablement (SFE) module 170. The SFE module 170 may include selecting a plurality of tenants from the data store of data related to one or more tenants 140, for a feature toggles enablement associated with a product feature present under a release plan.

According to some embodiments of the present discourse, the SFE module 170 may operate a model, such as tenant-tier-resolver model 120, to determine a tier-level-value and feature toggle enablement-state, to be stored in the data store of data related to one or more tenants 140, for each tenant of the selected plurality of tenants.

According to some embodiments of the present discourse, the tier-level-value of each tenant may be determined by the tenant-tier-resolver model 120 based on formula I:

Tenant Tier Value=if (TCC !=NULL) then TCC else ITTV. The Tenant Tier value as per Custom Config (TCC) may be a preconfigured tenant tier value. The Interim Tenant Tier Value (ITTV) may be calculated based on formula II. (II) ITTV=MIN (TNS, TIS). The Tenant Tier Value as per Number of Seats (TNS) is an associated number of agents and users that are using the product feature under the release plan, and Tenant tier value as per impact Rank (TIS) may be calculated based on formula III. (III) TIS=6−CEILING (((Impact Rank/a preconfigured number)*100)*5)/100).

According to some embodiments of the present discourse, for example, TCC may be set to '1' which is the tier-level that is last being enabled so to avoid feature toggles enablement at a particular day and hour it may be set to '1'. When TCC equals NULL then, the tenant tier-level-value may be equal to ITTV. The ITTV may be calculated by the minimum value of TNS which may be the number of users which are using the product feature under the release plan at the tenant site and TIS may be calculated based on the impact rank of the tenant. A high account impact rank may indicate that the tenant is a highly valued tenant and any disruptions in uptime can cause major loss to the tenant. The impact rank of a tenant may be retrieved from tenant metadata that may be stored in a data store, such as data store of data related to one or more tenants 140.

According to some embodiments of the present discourse, the tier-level-value of each tenant may be determined every preconfigure period by the tenant-tier-resolver model 120. The tier-level-value may change during runtime according to Tenant Tier Value as per No. of Seats. When there is an activity on a site of a prioritized tenant, then tenant-tier-resolver model 120 may relate this tenant to tier-level-value '1' or a tier-level-value that reflects a greater importance to the SaaS provider. If there are active agents using the API or the UI that a new product feature may be under the release plan, then tenant-tier-resolver model 120 may dynamically change the tier-level-value of the tenant from the lowest significant tier-level-value e.g., tier 5 to the most significant tier-level-value '1' to avoid enablement of the new product feature while user or agents are working.

According to some embodiments of the present discourse, initially the tenant-tier-resolver model 120 may determine the feature toggle enablement-state of each feature toggle associated with a product feature present under a release plan, for each tenant as 'false'. When each feature toggle is enabled, its enablement-state is set to 'true'.

Figure 3:
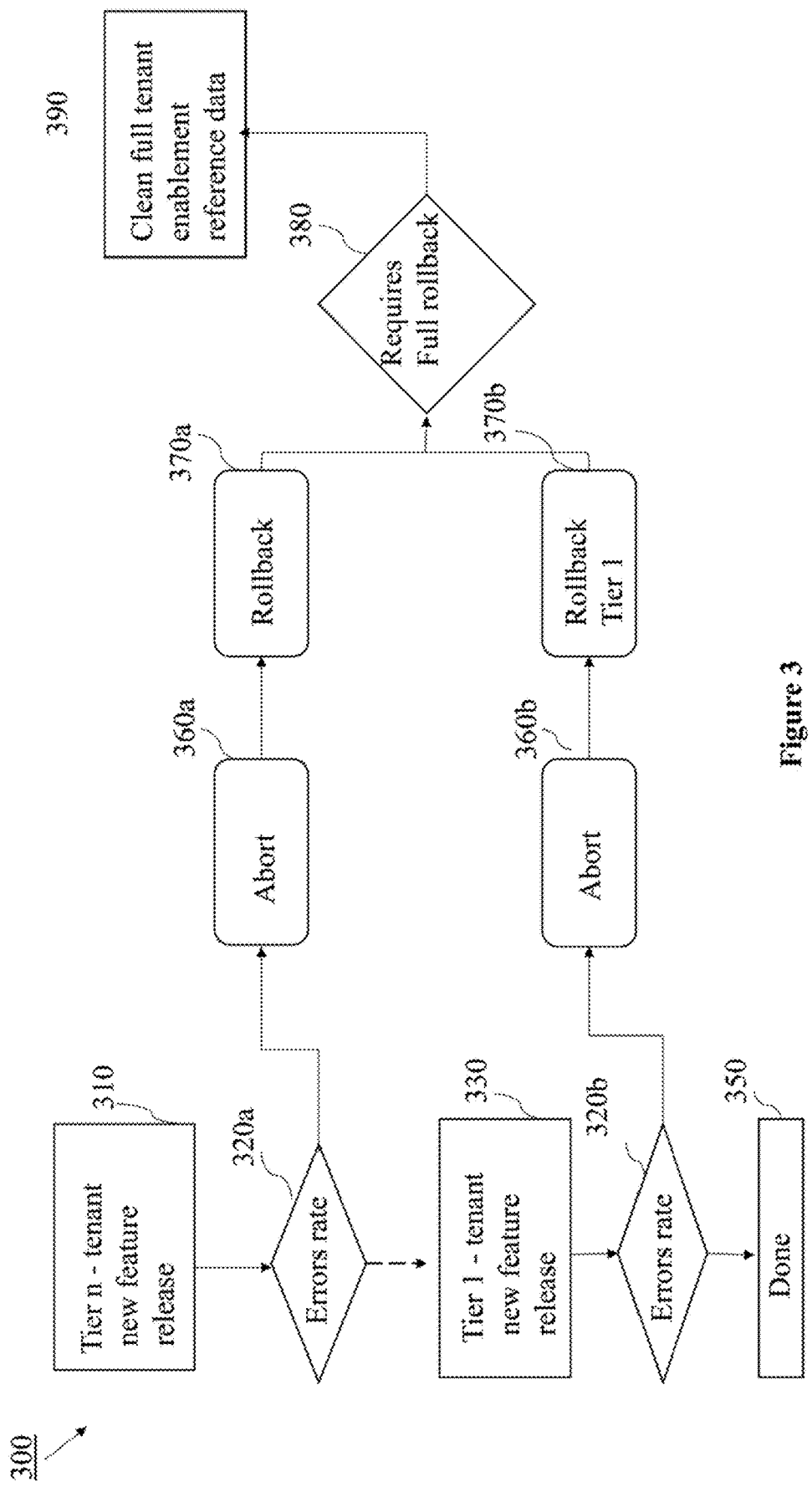
FIG. 3 is a high-level workflow of a feature toggle enablement module, in accordance with some embodiments of the present disclosure.
Figure 5:
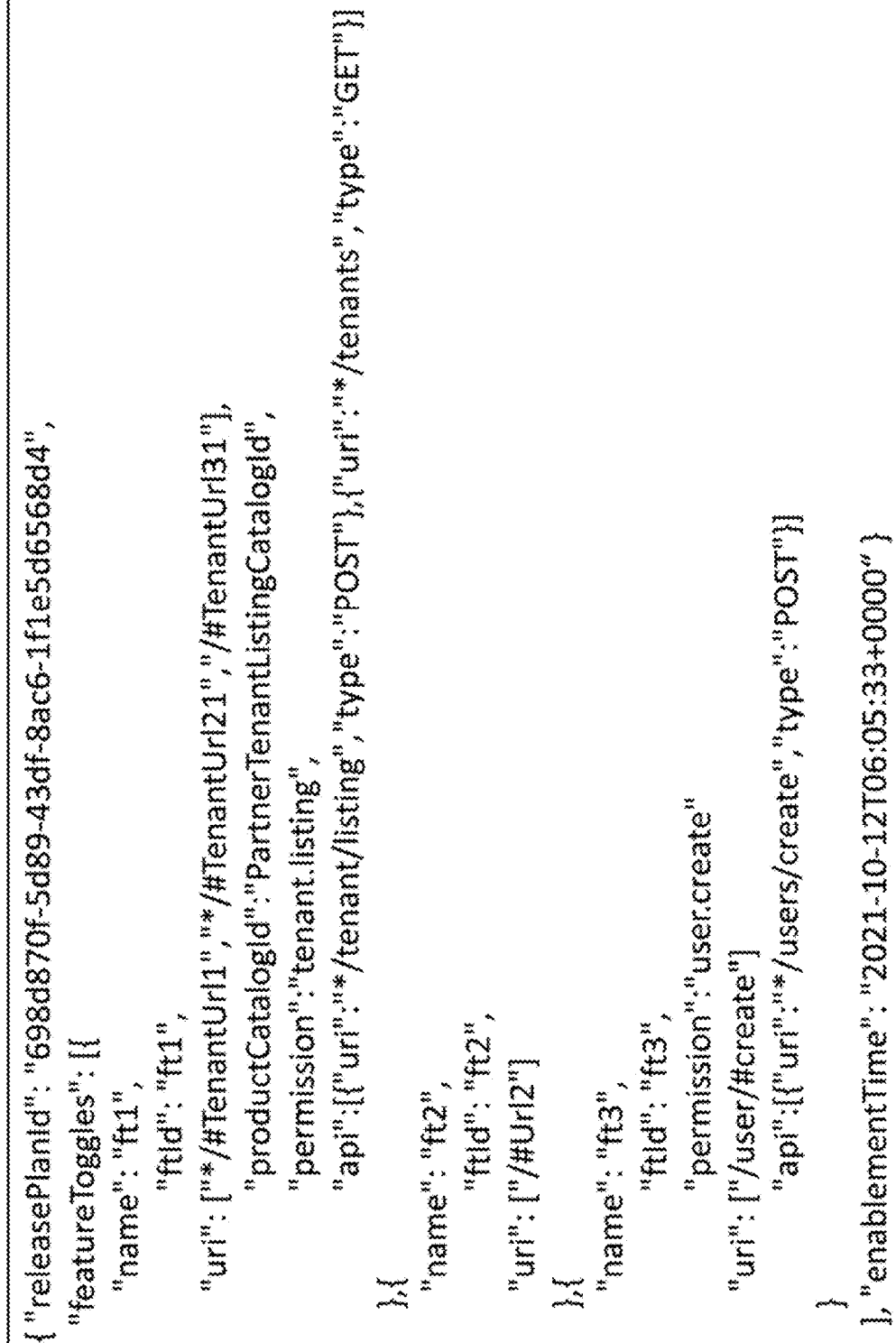
FIG. 5 illustrates an example of a release plan, in accordance with some embodiments of the present disclosure.

According to some embodiments of the present discourse, the SFE module 170 may further operate a module, such as feature toggle enablement module 180 and such as feature toggle enablement module 300 in FIG. 3, to enable feature toggles associated with a product feature present under the release plan, for example as shown by example 500 in FIG. 5, for tenants based on the determined tenant's tier-level-value.

According to some embodiments of the present discourse, the SFE module 170 may send a notification to be displayed via a display unit, such as display unit 150 for each feature toggles enablement.

According to some embodiments of the present discourse, the product feature present under the release plan may be of a User Interface (UI) or an Application Programming Interface (API).

According to some embodiments of the present discourse, the SFE module 170 may further include sharing a link to a help-document via a knowledge management platform (not shown), that is explaining the product feature present under the release plan, after all feature toggles under the plan release have been enabled. The link to the help-document may be shared with users to whom the product feature present under the release plan applies. The link to the help-document may be displayed via a display unit, when a user visits a UI that is associated with the feature toggles that have been enabled. For example, as shown in example 700 of notifications display, in FIG. 7

According to some embodiments of the present discourse, the operated feature toggle enablement module 180 may further enable feature toggles, associated with the product feature present under a release plan, tenant by tenant for a current tier-level-value from the highest tier-level-value and down. The feature toggle enablement module 180 may start with tenants of tier-level-value 'n' e.g., '5' which are low impacting tenants and end with tenants related to tier-level-value '1' which are high impacting tenants. As described in detail in the workflow of a feature toggle enablement module 300, in FIG. 3.

According to some embodiments of the present discourse, a module, such as feature toggle enablement module 180, and such as feature toggle enablement module 300 in FIG. 3, may further check an error rate during the enablement of the feature toggles, associated with the product feature present under the release plan and when the checked error rate may be higher than an error rate that has been observed before the operating of the feature toggle enablement module 180, the feature toggle enablement module 180 may paused. Optionally, when the feature toggle enablement module 180 is paused, an alarm may be raised, via a reporting mechanism, and then, details of a last enabled feature toggle are sent via a messaging service to be displayed on a display unit, of a computerized device, such as display unit 150.

According to some embodiments of the present discourse, the error rate may be based on a reporting mechanism, such as Amazon Web Services (AWS) cloud watch alarms, customers reported issues and error logs.

According to some embodiments of the present discourse, the error rate may be captured by external tools such as 'FullStory' and automated analysis of the contact-center SaaS platform.

According to some embodiments of the present discourse, a module, such as feature toggle enablement module 180, and such as feature toggle enablement module 300 in FIG. 3, may use a log-filtering technique to check the error rate.

According to some embodiments of the present discourse, when a module, such as feature toggle enablement module 180, and such as feature toggle enablement module 300 in FIG. 3, may have finished enabling all feature toggles which are associated with the product feature present under the release plan, for all tenants in the current tier-level-value, e.g., tier-level-value 'n' and the checked error rate is lower than an error rate which has been observed before operating the feature toggle enablement module 180, then enable feature toggles associated with the product feature present under the release plan tenant by tenant of the next tier-level-value may be enabled, e.g., tier-level-value 'n-1'. Tier-level 'n' may not exceed 10% of existing customers.

According to some embodiments of the present discourse, when the feature toggle enablement module 180 may finish the enablement of feature toggles associated with the product feature present under the release plan for all tenants in all tier-level-values, e.g., tier-levels 'n' through '1', the enablement of feature toggles associated with the product feature present under of the release plan ends.

According to some embodiments of the present discourse, a table may be maintained tenant-tier-resolver model 120 to store the feature toggles enablement process for each tenant. The table may include tenant Id and a structure including tenant tier-level-value, a list of feature toggles and a compatible list of URLs to be redirected when the feature is enabled. For example, a TASK under a database such as AWS DynamoDB, to track progress of the release plan, as shown in table 600 in FIG. 6.

According to some embodiments of the present discourse, when a feature toggle enablement-state is 'true' for a tenant, the module, such as SFE module 170 may include operating config and feature toggle API module to add a name of the tenant under an inclusion list. For example, the system, such as system 100 may dynamically resolve tenant tier-level under a NGINX/API Façade using information under a token, such as JavaScript Object Notation (SON) Web Token (JWT) and accordingly may direct the API or UI traffic of the tenants to a blue side e.g., new feature or green side, e.g., old feature.

According to some embodiments of the present discourse, when only part of the tier levels has been enabled, then the API or UI traffic of tenants of the tier-levels that have been enabled, e.g., tier-levels 'n' through 'n-m', may be directed to the blue side, which means to a code that includes the new product feature under the release plan. The API or UI traffic of tenants of the tier-levels which were not enabled, e.g., 'n-m-1' though '1', may be directed via the green side, which means to the code which does not include the new product feature.

According to some embodiments of the present discourse, all API or UI requests coming to the NGINX will make use of the data which has been stored in a data store, such as Remote Dictionary Server (REDIS). When a new API or UI request may be received, a NGINX script may parse a value of "Authorization Bearer" header. The value of this header may be a JSON Web Token (JWT). This token has a payload part which is parsed and a tenant identification (ID) may be extracted from it. Using the extracted tenant II), the feature toggle enablement-state may be retrieved from the data store such as REDIS.

In a non-limiting example, for a tenant with tenant ID 'b7255cba-46b3-4b8d-ad9f-547d507489de', may be retrieved from the REDIS along with the following details: {"tenantTierValue":n,"featureToggles":("ft1":true,"ft2": true,"ft3":false}"redirect:" {"/url1":true,"/url2":true,"/url3":true}. Therefore, e.g., when a url1 API request for tenant from tier-level-value 'n', such as tenant ID 'b7255cba-46b3-4b8d-ad9f-547d507489de', the request will go to the new API version on the blue side, because the toggle for this URL, i.e., 'ft1', has been enabled.

In yet another example, for a tenant with a tenant ID 'f966349c-e054-4a52-bf55-8691f3e367dV', which may have been determined as tier-level-value '1' and stored in the data store, such as of date related to one or more tenants 140 in FIG. 1, with the following details: {"tenantTierValue": 1."featureToggles":{"ft1":false,"ft2":false,"ft3":false),"redirect:" {"/url1":false,"/url2":false,"/url3":false}}. Therefore, e.g., when a url1 API request for tenant from tier-level-value '1', such as tenant ID 'f966349c-e054-4a52-bf55-8691f3e367d1', the request will go to the old API version on the green side, because the toggle for this URL, i.e., 'ft1', has not been enabled yet.

According to some embodiments of the present discourse, the release plan, for example release plan 500 in FIG. 5, may include one or more feature toggles and an enablement time and each feature toggle of the one or more feature toggles may include a feature toggle name and an associated Uniform Resource Identifier (URI). The tenant-tier-resolver model 120 and the feature toggle enablement module 180 may operate when the enablement time of the release plan has elapsed.

According to some embodiments of the present discourse, when the feature toggle enablement module 180 may enable a feature toggle it may also enable a Uniform Resource Identifier (URI) that is associated with the enabled feature toggle.

For example, there may be a sequence which has to be preserved while enabling feature toggles to avoid a situation where a new feature of UI may be enabled before the API which is error prone. Therefore, the release plan associated with the API and the UI to be enabled may be controlled during the enablement, such that the feature toggles related to the API may be enabled before the feature toggles related to the UI and the redirection to a new WebApp may be after API changes.

Figure 2:
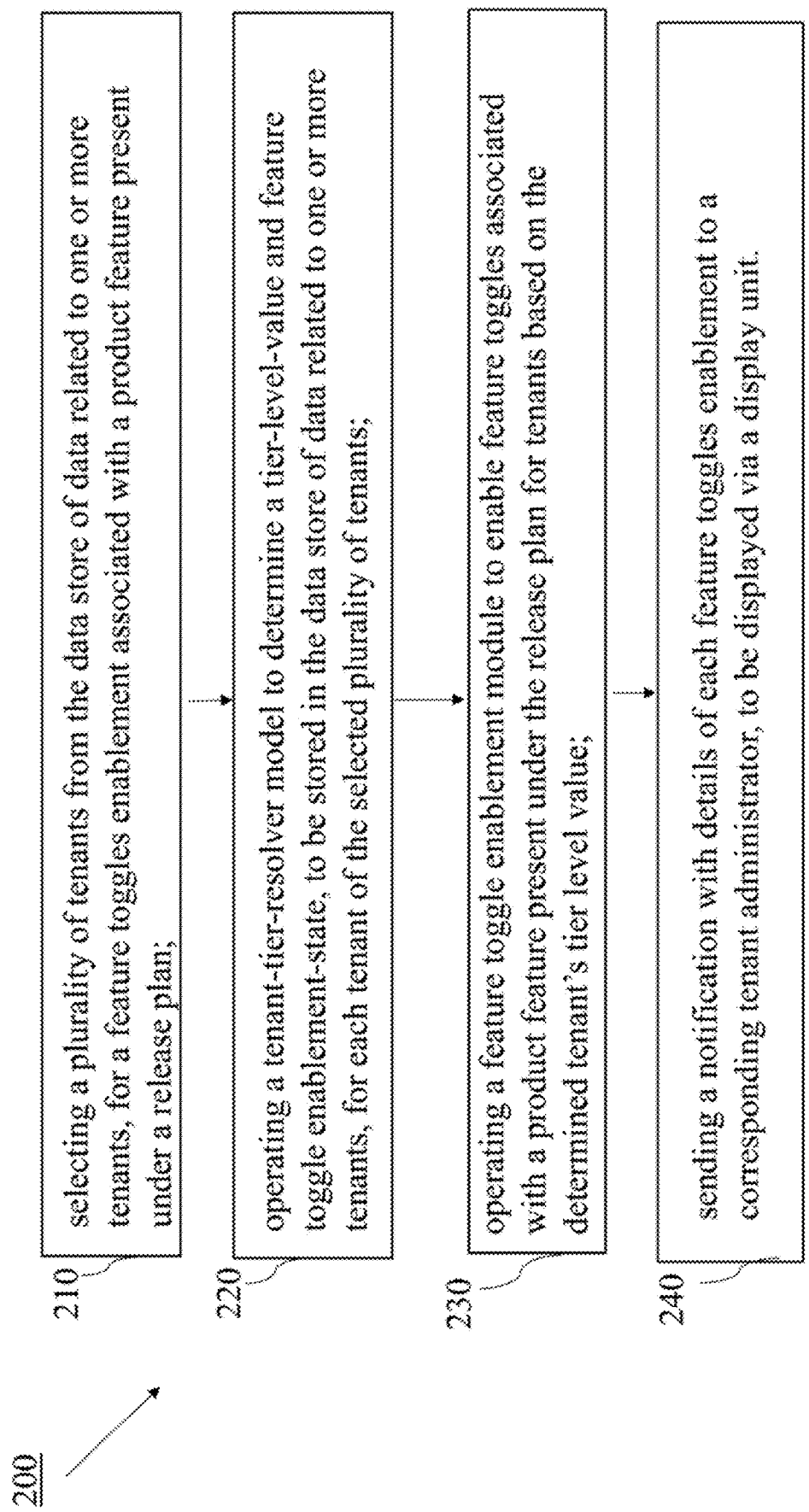
FIG. 2 is a high-level workflow of a Staggered-Feature-Enablement (SFE) module, in accordance with some embodiments of the present disclosure.

FIG. 2 is a high-level workflow of a Staggered-Feature-Enablement (SFE) module 200, in accordance with some embodiments of the present disclosure.

According to some embodiments of the present discourse, operation 210, may comprise selecting a plurality of tenants from the data store of data related to one or more tenants, for a feature toggles enablement associated with a product feature present under a release plan. For example, release plan 500 in FIG. 5.

According to some embodiments of the present discourse, operation 220, may comprise operating a tenant-tier-resolver model to determine a tier-level-value and feature toggle enablement-state, to be stored in the data store of data related to one or more tenants, for each tenant of the selected plurality of tenants.

According to some embodiments of the present discourse, operation 230, may comprise operating a feature toggle enablement module to enable feature toggles associated with a product feature present under the release plan for tenants based on the determined tenant's tier level.

According to some embodiments of the present discourse, operation 240, may comprise sending a notification with details of each feature toggles enablement to a corresponding tenant administrator, to be displayed via a display unit.

FIG. 3 is a high-level workflow of a feature toggle enablement module 300, in accordance with some embodiments of the present disclosure.

According to some embodiments of the present discourse, for each tenant of a selected plurality of tenants, a model, such as tenant-tier-resolver model 120 in FIG. 1, may determine a tier-level-value and feature toggle enablement-state to be stored in a data store, such as data store of data related to one or more tenants 140. The tenant tier-level-value, the feature toggle enablement-state and the related URLs may be maintained in a table, in a data store, to track the progress of the release plan, such as table 600 in FIG. 6.

According to some embodiments of the present discourse, feature toggle enablement module 300 may be operated based on the tenant's determined tier-level-value. The module, such as feature toggle enablement module 300 and such as feature toggle enablement module 180 in FIG. 1, may enable feature toggles associated with a product feature present under a release plan, e.g., release plan 500 in FIG. 5.

According to some embodiments of the present discourse, the feature toggle enablement module 300 may check an error rate during the enablement of the feature toggles, associated with the product feature present under the release plan and when the checked error rate 320a is higher than an error rate that has been observed before operating the feature toggle enablement module 300, the feature toggle enablement module may be paused, e.g., abort 360a for tier-level-value 'n' and then perform a rollback 370a. The same process may be operated for all tire-level-values from 'n' through '1'.

According to some embodiments of the present discourse, for example, for tier-level-value '1', when the checked error rate 320b is higher than an error rate that has been observed before operating the feature toggle enablement module 300, the feature toggle enablement module may be paused, e.g., abort 360b for tier-level-value '1' and then perform a rollback 370b. The feature toggle enablement module 300 may use a log-filtering technique to check the error rate or any other technique.

According to some embodiments of the present discourse, after each rollback, e.g., 370a and 370b a check if a full rollback is required 380 may be operated and then full tenant enablement reference data may be cleaned 390.

According to some embodiments of the present discourse, under certain circumstances, the release plan state may be set to "ROLLBACK" when the rollback process has to be initiated. In case of "ROLLBACK" state a model, such as tenant-tier-resolver model 120 in FIG. 1 may set 'false' to all the feature toggles and Uri's under REDIS, for example, as shown in table 600 in FIG. 6. Also, it may change the statue of the release plan from "ROLLBACK" to "PAUSE".

According to some embodiments of the present discourse, under certain circumstances the whole process for all tenant may have to be reinitiated. To perform this activity and clean the execution performed for few tenants the release plan state may be set to "RESTART". On receiving a "RESTART" state a model, such as tenant-tier-resolver model 120 in FIG. 1 may clear all states under REDIS and DynamoDB. For example, the states as shown in table 600 in FIG. 6.

According to some embodiments of the present discourse, the feature toggle enablement module 300 may enable feature toggles, associated with the product feature present under a release plan, tenant by tenant for a current tier-level-value, from the highest tier-level-value and down, e.g., tier-level-value 'n' through tier-level-value '1'. For example, tier-level-value 'n', e.g., '5' having related low impacting tenants may have feature toggles enabled before tier-level-value that have high impact tenants. Tenants that have been determined by a model, such as tenant-tier-resolver model 120 in FIG. 1, as related to tier-level-value 'n' may be the least significant to the contact-center SaaS platform provider.

According to some embodiments of the present discourse, tenants that have been determined by a model, such as tenant-tier-resolver model 120 in FIG. 1, as related to tier-level-value '1' 330, may be the most significant to the contact-center SaaS platform provider, and will be enabled the last from all tier-levels for the new product feature, thus guaranteeing minimum impact thereon.

According to some embodiments of the present discourse, after the feature toggle enablement module 300 may have finished the enablement of feature toggles associated with the product feature present under the release plan for all tenants in all tier-level-values, e.g., tier-level-value 'n' 310 through tier-level-value '1' 330, the enablement of feature toggles associated with the product feature present under of the release plan ends, e.g., done 350.

According to some embodiments of the present discourse, when the feature toggle enablement module 300 may be paused an alarm may be raised via a reporting mechanism and then details of a last enabled feature toggle may be sent via a messaging service to be displayed on a display unit of a computerized device.

According to some embodiments of the present discourse, when the feature toggle enablement module 300 finished enabling all feature toggles associated with the product feature present under the release plan for all tenants in the current tier-level-value, e.g., tier-level-value 'n' and the checked that the error rate is lower than an error rate that has been observed before operating the feature toggle enablement module 300, then the feature toggle enablement module 300 may enable feature toggles associated with the product feature present under the release plan tenant by tenant of the next tier-level-value, e.g., tier-level-value 'n-1'.

According to some embodiments of the present discourse, a release engineer may submit a release plan to the system. A "Release Tier Tenant" module is a service that is responsible for managing and maintaining a release plan. On submission of a new release plan its state is "SCHEDULED".

According to some embodiments of the present discourse, a scheduled lambda under "Release Tier Tenant" module may check executionTime under each release plan and if the time has elapsed it moves the release plan from a "SCHEDULED" to an "IN-PROGRESS" state. After the "Release Tier Tenant" module is put in progress state a lambda under "Tenant Tier Resolver" module, such as tenant-tier-resolver model 120 in FIG. 1, may create a new TASK under a database such as AWS DynamoDB, to track progress of the release Plan.

According to some embodiments of the present discourse, based on enabled Tier Value under AWS DynamoDB, "Tenant Tier Resolver" module, such as tenant-tier-resolver model 120 in FIG. 1, may find all the matching tenants from REDIS and may initiates a feature toggles enablement process. A list of tenants under the plan of feature toggles enablement may be maintained under a data store, such as DynamoDB along with enablement time for each feature and each tenant as per "Tenant Tier Value" for each tenant, as shown for example, in table 600 in FIG. 6.

According to some embodiments of the present discourse, when the feature enablement time present under AWS DynamoDB elapses, then a module, such as tenant-tier-resolver model 120 in FIG. 1, may enable feature toggle enablement-state for a specific tenant under REDIS.

According to some embodiments of the present discourse, the feature toggle enablement module 300 may be implemented as a scheduled Amazon Web Services (AWS) lambda which runs every 5 minutes. The scheduled AWS lambda may receive a list of tenants and their tier-level-value and feature toggle enablement-state from a data store, such as REDIS. When a feature toggle enablement-state is 'true' under REDIS for a specific tenant it may call a module, such as Config and Feature toggle API, to add the name of the tenant under an inclusion list. Thus, enabling a feature toggle for the specific tenant.

According to some embodiments of the present discourse, once a feature toggle may be enabled under a feature toggle service it may also enable the Uniform Resource Identifier (Uri), that is associated with this feature toggle under REDIS. Since the release plan is operating across regions around the world it may be agnostic to region settings and therefore may use Uris, as each region has a separate host and the URL for every region may be different. Thus, the feature toggle service not only refers to the data under REDIS, but it also may update the Uri's list associated with each tenant, as shown in table 600 in FIG. 6.

According to some embodiments of the present discourse, updating the state of a URL under the feature toggle enablement module 300 which may be implemented as a scheduled AWS lambda may ensure that enablement of feature toggle and redirection to the blue side e.g., new feature under NGINX happens at the same time.

According to some embodiments of the present discourse, during the operation of the feature toggle enablement module 300, all the Application Programming Interface (API) Uniform Resource Locator (URL) and User Interface (UI) URL whose traffic needs to be redirected to the new version may be found. Tenants for whom feature toggles have been enabled, the data model under REDIS referred by NGINX may be modified.

According to some embodiments of the present discourse, the tenant resolver service may refer the release plan and tenant tier-level-value and accordingly may modify the data store. The Feature toggle enablement module 180 may enable feature toggles referring REDIS and NGINX which may redirect requests to appropriate API and WebApp using the same REDIS using feature toggles that have been enabled. Thus, the enablement of feature toggles of API may be operated first, redirection for API may be enabled after it and finally the redirection of UI may be enabled.

Then, API traffic and UI traffic may be shifted to a newer version for the API URL or UI URL, associated with the enabled feature toggle with specific tenants.

Figures 4A, 4B:
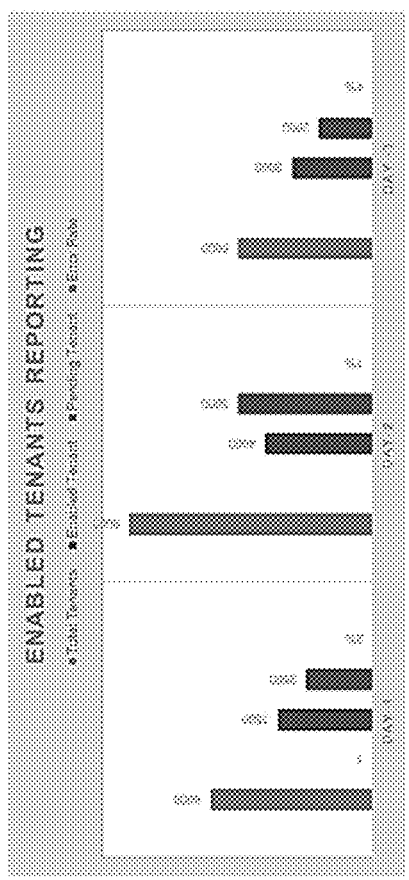
FIG. 4A shows an example of a reporting tool as a table, in accordance with some embodiments of the present disclosure.
FIG. 4B shows an example of a reporting tool with a graphical representation, in accordance with some embodiments of the present disclosure.

FIG. 4A is an example 400A of a reporting tool as a table, in accordance with some embodiments of the present disclosure.

According to some embodiments of the present discourse, when a tenant may configure a specific day and hour for a new product feature release then the feature toggles may be enabled during that time. Based on the configuration of the tenant the Tenant Tier value per Configuration (TCC) may be set to '1', when there will be no feature toggles enablement on that day, e.g., it is not the day and hour as in the tenant configuration. When a tenant has configured the feature release for a specific day and hour, then the TCC may be set to a tier-level-value that is currently under execution. However, it may happen that all other tenants have been migrated and so leftover tenants feature toggles may be enabled on a different day and time than they have configured.

According to some embodiments of the present discourse, example 400A of a reporting tool as a table shows that on the first day when the total number of tenants was 6000, 3500 have been enabled and 2500 are pending with an error rate of 2%. On the second day when the total number of tenants was 9000, 4000 have been enabled and 5000 are pending with an error rate of 1%. On the third day, when the total number of tenants was 5000, 3000 have been enabled and 2000 are pending with an error rate of 4%.

FIG. 4B is an example 400B of a reporting tool with a graphical representation, in accordance with some embodiments of the present disclosure.

According to some embodiments of the present discourse, example 400B shows a graphical representation of the data in example 400A.

FIG. 5 illustrates an example 500 of a release plan, in accordance with some embodiments of the present disclosure.

According to some embodiments of the present discourse, a release plan, such as the release plan in example 500 may be associated with a product feature present under the release plan and may have a release plan identification (Id).

According to some embodiments of the present discourse, each release plan may include a list of feature toggles which needs to be enabled under the release plan.

According to some embodiments of the present discourse, each feature toggle in the list of feature toggles may have a feature toggle name. For example, 'ft1', 'ft2', 't3'.

According to some embodiments of the present discourse, each feature toggle in the list of feature toggles may have a feature toggle Id, e.g., 'ftId', which is the actual Id of the feature toggle as it has been created under feature toggle service. For example, 'ft1', 'ft2', 'ft3'.

According to some embodiments of the present discourse, each feature toggle in the list of feature toggles may have a Uniform Resource Identifier (URI) which may include the address of all the User Interface (UI) pages which are affected by the feature toggle enablement.

According to some embodiments of the present discourse, the URI of each feature toggle may be used for operating config and feature toggle API module to add a name of the tenant under an inclusion list when the feature toggle enablement state is 'true' for example, blue implementation of a Web Application, so that the API or UI traffic of tenants of the tier-levels that have been enabled, e.g., tier-levels 'n' through 'n-m', may be directed to the blue side, which means to a code that includes the new product feature under the release plan. The API or UI traffic of tenants of the tier-levels which were not enabled, e.g., 'n-m-1' though '1', may be directed via the green side, which means to the code which does not include the new product feature.

According to some embodiments of the present discourse, featureToggles.productCatalogId may be the feature id under a product catalog. It may be referred to and required to verify the license belonging to a tenant.

According to some embodiments of the present discourse, featureToggles.permission may be the permission that is associated with a feature.

According to some embodiments of the present discourse, featureToggles.api may be a list of API endpoints which have been added or modified under a particular feature toggle. FeatureToggles.api may be part of feature toggle enablement module, such as feature toggle enablement module 180, in FIG. 1 and such as operation 230 in FIG. 2.

According to some embodiments of the present discourse, for example, feature toggle 'Ft1' may be a feature toggle belonging to a tenant listing feature for a partner. As part of this feature, a tenant listing page under a tenant management application has been modified and the also the tenant listing API. In this case if a partner tenant with a "PartnerTenantListingCatalogId" license may have to be enabled, then feature toggles enablement module, such as feature enablement module 180 in FIG. 1, and feature enablement module 300 in FIG. 3, may start from the highest tier-level, e.g., 'n', which is the least significant tenants to the SaaS provider, through tenants of tier-level '1', which are the most significant tenants to the SaaS provider.

According to some embodiments of the present discourse, for example, feature toggle 'Ft2' may be a simple feature random URL. This type of feature toggle may not operate any checks and enablement for URLs and may enable API redirection on NGINX. This feature toggle may enable 'Url2' one after another after expiration or enablement date and it may ignore product license and permission.

According to some embodiments of the present discourse, for example, feature toggle 'Ft3' may be for releasing API changes first for 'User Create', before creating page changes. Based on the users who have a user.create permission.

FIG. 6 illustrates an example of a table to track progress of a release plan, in accordance with some embodiments of the present disclosure.

According to some embodiments of the present discourse, "redirect" is an attribute of type MAP. It respects sequence of entries under it. Assuming/url1 is an API URI, then it may be enable/url1 before/url2 and/url3 as per the sequence under the redirect attribute. For example, for tenant ID 'f277cd47-042d-4c76-g0dc-a40f7c8a9287', when the structure may be, e.g., {"tenantTierValue":2, "featureToggles": {"ft1":false,"ft2":false,"ft3":false} "redirect": {"/url1": false,"/url2":false,"/url3":false) then, the feature toggles enablement may be ft1→ft2→ft3 which may be for example, /url1 (API)→/url2 (UI)→/url3 (UI).

Figure 7:
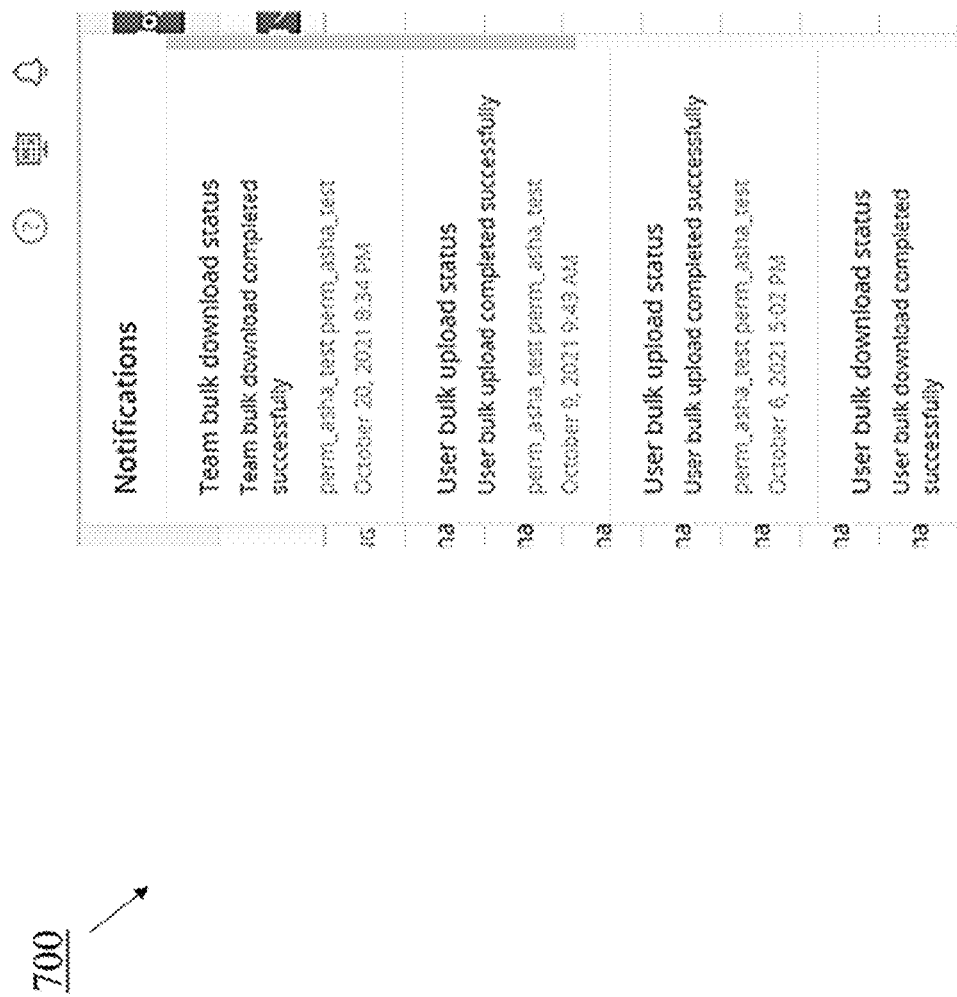
FIG. 7 illustrates an example of a notifications display, in accordance with some embodiments of the present disclosure.

FIG. 7 illustrates an example 700 of a notifications display, in accordance with some embodiments of the present disclosure.

According to some embodiments of the present discourse, when any agent or user may login to the contact-center SaaS platform in the tenant site performs there may be a message under the notification of that particular user which may help the user understand that several features have been changed. For example, the messages in example 700 may be delivered via the UI to each user independently.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to coverall such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method to operate a feature toggles enablement associated with a product feature present under a release plan, in a staggered manner based on tenants' prioritization for tenants of a cloud-based Software as a contact-center Service (SaaS) platform, the computerized-method comprising:

in a cloud-computing environment that is operating a SaaS-platform-contact-center for one or more tenants, said cloud-computing environment comprising one or more processors, a data store of data related to one or more tenants, said one or more processors are operating a Staggered-Feature-Enablement (SFE) module, said SFE module comprising:

(i) selecting a plurality of tenants from the data store of data related to the one or more tenants, for the feature toggles enablement associated with the product feature present under the release plan;

(ii) after an enablement time of the release plan has elapsed;

a. determining a tier-level-value and feature toggle enablement-state by operating a tenant-tier-resolver model and storing the tier-level-value and feature toggle enablement-state in the data store of data related to the one or more tenants, for each tenant of the selected plurality of tenants;

b. enabling feature toggles associated with the product feature present under the release plan for tenants, wherein said feature toggles remotely executes a code of the new product feature, c. checking a first error rate during the enablement of the feature toggles, associated with the product feature present under the release plan, by operating a feature toggle enablement module, based on the determined tier-level-value, and d. pausing the feature toggle enablement module after the checked first error rate is higher than a second error rate observed before operating the feature toggle enablement module, wherein said feature toggle enablement module enables the feature toggles, associated with the product feature present under the release plan, tenant by tenant for a current tier-level-value and from a highest tier-level-value and down;

(iii) sending a notification with details of each feature toggles enablement to a corresponding tenant administrator, to be displayed via a User Interface (UI) on a display unit; and (iv) sharing a link to a help-document via a UI of a knowledge management platform that is explaining the product feature present under the release plan after all feature toggles under the release plan have been enabled, wherein the release plan comprising one or more feature toggles and the enablement time, wherein each feature toggle of the one or more feature toggles comprising a feature toggle name and an associated Uniform Resource Identifier (URI).

2. The computerized method of claim 1, wherein the product feature present under the release plan is of a User Interface (UI) or an Application Programming Interface (API).

3. The computerized method of claim 1, wherein the link to the help-document is shared with users to whom the product feature present under the release plan applies.

4. The computerized method of claim 1, wherein the computerized-method further comprises displaying the link to the help-document to a user that visits a UI that is associated with the feature toggles that have been enabled.

5. The computerized method of claim 1, wherein the tenant-tier-resolver model is determining the tier-level-value for each tenant of the selected plurality of tenants based on formula I:

Tenant Tier Level Value=if (*TCC*!=NULL) then *TCC*else ITTV            (I)

whereby:

Tenant Tier Level value as per Custom Config (TCC) is a preconfigured tenant tier level value, Interim Tenant Tier Value (ITTV) is calculated based on formula II:

ITTV=MIN(*TNS*,*TIS*)            (II)

whereby:

Tenant Tier Value as per number of Seats (TNS) is an associated number of agents and users that are using the product feature under the release plan, and Tenant Tier Value as per Impact Rank (TIS) is calculated based on formula III:

*TIS*=6−CEILING (((Impact Rank/*a* preconfigured number)*100)*5)/100).            (III)

6. The computerized method of claim 1, wherein the feature toggle enablement module uses a log-filtering technique to check the first error rate.

7. The computerized method of claim 1, wherein the computerized-method further comprising raising an alarm via a reporting mechanism after the feature toggle enablement module is paused and wherein after the alarm has been raised, details of a last enabled feature toggle are sent via a messaging service to be displayed on a display unit of a computerized device.

8. The computerized method of claim 1, wherein the computerized-method is further comprises operating the feature toggle enablement module to further enable feature toggles associated with the product feature present under the release plan tenant by tenant of a next tier-level-value, after the feature toggle enablement module has finished enabling all feature toggles associated with the product feature present under the release plan for all tenants in the current tier-level-value and the checked error rate is lower than the error rate observed before operating the feature toggle enablement module.

9. The computerized method of claim 1, wherein the computerized-method further comprises ending the enablement of feature toggles associated with the product feature present under the release plan after the feature toggle enablement module finishes the enablement of feature toggles associated with the product feature present under the release plan for all tenants in all tier-level-values.

10. The computerized method of claim 1, wherein said SFE module further comprises operating a config and feature toggle API module to add a name of a tenant under an inclusion list for each tenant that a feature toggle enablement-state is 'true'.

11. The computerized method of claim 1, wherein when the feature toggle enablement module enables a feature toggle it also enables a Uniform Resource Identifier (URI) that is associated with the enabled feature toggle.

12. A computerized-system in a cloud-computing environment to operate a feature toggles enablement associated with a product feature present under a release plan in a staggered manner based on tenants' prioritization for tenants of a cloud-based Software as a contact-center Service (SaaS) platform, the computerized-system comprising:

one or more processors; and a data store of data related to one or more tenants, said one or more processors are operating a Staggered-Feature-Enablement (SFE) module, said SFE module is configured to:

(i) select a plurality of tenants from the data store of data related to the one or more tenants, for the feature toggles enablement associated with the product feature present under the release plan;

(ii) after an enablement time of the release plan has elapsed:

a. determine a tier-level-value and feature toggle enablement-state by operating a tenant-tier-resolver model and storing the tier-level-value and feature toggle enablement-state in the data store of data related to the one or more tenants, for each tenant of the selected plurality of tenants;

b. automatically enable feature toggles associated with the product feature present under the release plan for tenants and checking a first error rate during the enablement of the feature toggles, associated with the product feature present under the release plan, by operating a feature toggle enablement module, based on the tier-level-value, wherein said feature toggles remotely executes a code of the new product feature, wherein when the checked first error rate is higher than a second error rate observed before operating the feature toggle enablement module, the feature toggle enablement module is paused, and wherein said feature toggle enablement module enables the feature toggles, associated with the product feature present under the release plan, tenant by tenant for a current tier-level-value and from a highest tier-level-value and down;

(iii) send a notification with details of each feature toggles enablement to a corresponding tenant administrator, to be displayed via a User Interface (UI) on a display unit; and (iv) share a link to a help-document via a UI of a knowledge management platform that is explaining the product feature present under the release plan after all feature toggles under the release plan have been enabled, wherein the release plan comprising one or more feature toggles and the enablement time, and wherein each feature toggle of the one or more feature toggles comprising a feature toggle name and an associated Uniform Resource Identifier (URI).

13. A computerized-method to operate a feature toggles enablement associated with a product feature present under a release plan, in a staggered manner based on tenants' prioritization for tenants of a cloud-based Software as a contact-center Service (SaaS) platform, the computerized-method comprising:

in a cloud-computing environment that is operating a SaaS-platform-contact-center for one or more tenants, said cloud-computing environment comprising one or more processors, a data store of data related to one or more tenants, said one or more processors are operating a Staggered-Feature-Enablement (SFE) module, said SFE module comprising:
(i) selecting a plurality of tenants from the data store of data related to the one or more tenants, for the feature toggles enablement associated with the product feature present under the release plan;
(ii) after an enablement time of the release plan has elapsed:
a. determining a tier-level-value and feature toggle enablement-state by operating a tenant-tier-resolver model and storing the determined tier-level-value and feature toggle enablement state in the data store of data related to the one or more tenants for each tenant of the selected plurality of tenants;
b. automatically enabling feature toggles associated with the product feature present under the release plan for tenants and checking a first error rate during the enablement of the feature toggles, associated with the product feature present under the release plan, by operating a feature toggle enablement module based on the tier-level-value, wherein when the checked first error rate is higher than a second error rate observed before operating the feature toggle enablement module, the feature toggle enablement module is paused, and
wherein said feature toggle enablement module enables the feature toggles, associated with the product feature present under the release plan, tenant by tenant for a current tier-level-value and from a highest tier-level-value and down;
(iii) sending a notification with details of each feature toggles enablement to a corresponding tenant administrator, to be displayed via a User Interface (UI) on a display unit,
wherein the product feature present under the release plan is one of a User Interface (UI) and an Application Programming Interface (API),
wherein the release plan comprising one or more feature toggles and the enablement time,
wherein each feature toggle of the one or more feature toggles comprising a feature toggle name and an associated Uniform Resource Identifier (URI), and
wherein said feature toggles remotely executes a code of the new product feature.

14. A computerized-method to operate a feature toggles enablement associated with a product feature present under a release plan, in a staggered manner based on tenants' prioritization for tenants of a cloud-based Software as a contact-center Service (SaaS) platform, the computerized-method comprising:

in a cloud-computing environment that is operating a SaaS-platform-contact-center for one or more tenants, said cloud-computing environment comprising one or more processors, a data store of data related to one or more tenants, said one or more processors are operating a Staggered-Feature-Enablement (SFE) module, said SFE module comprising:
(i) selecting a plurality of tenants from the data store of data related to the one or more tenants, for the feature toggles enablement associated with the product feature present under the release plan;
(ii) determining a tier-level-value and feature toggle enablement-state by operating a tenant-tier-resolver model and storing the tier-level-value and feature toggle enablement-state in the data store of data related to the one or more tenants, for each tenant of the selected plurality of tenants;
(iii) enabling feature toggles associated with the product feature present under the release plan for tenants and checking a first error rate during the enablement of the feature toggles, associated with the product feature present under the release plan, by operating a feature toggle enablement module, based on the tier-level-value, wherein said feature toggles remotely executes a code of the new product feature,
wherein when the checked first error rate is higher than a second error rate observed before operating the feature toggle enablement module, the feature toggle enablement module is paused, and
wherein said feature toggle enablement module enables the feature toggles, associated with the product feature present under the release plan, tenant by tenant for a current tier-level-value and from a highest tier-level-value and down; and
(iv) sending a notification with details of each feature toggles enablement to a corresponding tenant administrator, to be displayed via a UI on a display unit, wherein the tenant-tier-resolver model is determining the tier-level-value for each tenant of the selected plurality of tenants based on formula I:

$$\text{Tenant Tier Level Value} = \text{if } (TCC != \text{NULL}) \text{ then } TCC \text{ else ITTV whereby:} \quad (I)$$

Tenant Tier Level value as per Custom Config (TCC) is a preconfigured tenant tier level value, and
Interim Tenant Tier Value (ITTV) is calculated based on formula II:

$$ITTV = \text{MIN}(TNS, TIS) \quad (II)$$

whereby:
Tenant Tier Value as per number of Seats (TNS) is an associated number of agents and users that are using the product feature under the release plan, and
Tenant Tier Value as per Impact Rank (TIS) is calculated based on formula III:

$$TIS = 6 - \text{CEILING}(((\text{Impact Rank}/a \text{ preconfigured number})*100)*5)/100). \quad (III)$$

15. A computerized-method to operate a feature toggles enablement associated with a product feature present under a release plan, in a staggered manner based on tenants' prioritization for tenants of a cloud-based Software as a contact-center Service (SaaS) platform, the computerized-method comprising:

in a cloud-computing environment that is operating a SaaS-platform-contact-center for one or more tenants, said cloud-computing environment comprising one or more processors, a data store of data related to one or more tenants, said one or more processors are operating a Staggered-Feature-Enablement (SFE) module,
said SFE module comprising:
(i) selecting a plurality of tenants from the data store of data related to the one or more tenants, for the feature toggles enablement associated with the product feature present under the release plan;
(ii) determining a tier-level-value and feature toggle enablement-state by operating a tenant-tier-resolver model and storing the tier-level-value and feature toggle enablement-state in the data store of data related to the one or more tenants, for each tenant of the selected plurality of tenants;

(iii) enabling feature toggles associated with the product feature present under the release plan for tenants and checking a first error rate during the enablement of the feature toggles, associated with the product feature present under the release plan, by operating a feature toggle enablement module, based on the tier-level-value, wherein said feature toggles remotely executes a code of the new product feature, wherein when the checked first error rate is higher than a second error rate observed before operating the feature toggle enablement module, the feature toggle enablement module is paused, and wherein said feature toggle enablement module enables the feature toggles, associated with the product feature present under the release plan, tenant by tenant for a current tier-level-value and from a highest tier-level-value and down;

(iv) sending a notification with details of each feature toggles enablement to a corresponding tenant administrator, to be displayed via a UI on a display unit; and (v) operating a config and feature toggle API module to add a name of the tenant under an inclusion list for each tenant that a feature toggle enablement-state is 'true'.

16. A computerized-method to operate a feature toggles enablement associated with a product feature present under a release plan, in a staggered manner based on tenants' prioritization for tenants of a cloud-based Software as a contact-center Service (SaaS) platform, the computerized-method comprising:

in a cloud-computing environment that is operating a SaaS-platform-contact-center for one or more tenants, said cloud-computing environment comprising one or more processors, a data store of data related to one or more tenants, said one or more processors are operating a Staggered-Feature-Enablement (SFE) module, said SFE module comprising:

(i) selecting a plurality of tenants from the data store of data related to the one or more tenants, for the feature toggles enablement associated with the product feature present under the release plan, wherein the release plan comprising one or more feature toggles and an enablement time, and wherein each feature toggle of the one or more feature toggles comprising a feature toggle name and an associated Uniform Resource Identifier (URI), (ii) determining a tier-level-value and feature toggle enablement-state by operating a tenant-tier-resolver model when the enablement time of the release plan has elapsed, and storing the tier-level-value and feature toggle enablement-state in the data store of data related to the one or more tenants, for each tenant of the selected plurality of tenants;

(iii) enabling feature toggles associated with the product feature present under the release plan for tenants and checking a first error rate during the enablement of the feature toggles, associated with the product feature present under the release plan, by operating a feature toggle enablement module, based on the tier-level-value, wherein said feature toggles remotely executes a code of the new product feature, and wherein said feature toggle enablement module enables the feature toggles, associated with the product feature present under the release plan, tenant by tenant for a current tier-level-value and from a highest tier-level-value and down, (iv) pausing the feature toggle enablement module when the checked first error rate is higher than a second error rate observed before operating the feature toggle enablement module; and (v) sending a notification with details of each feature toggles enablement to a corresponding tenant administrator, to be displayed via a UI on a display unit.

\* \* \* \* \*